June 30, 1970  W. B. DAUGHTRY  3,517,868
CARRIERS FOR FOOD PLATES, CUPS, SANDWICHES AND THE LIKE
Filed Oct. 9, 1967  5 Sheets-Sheet 1

INVENTOR
Wallace B. Daughtry
by McDougall, Hersh, Scott
and Ladd
Att'ys

June 30, 1970 W. B. DAUGHTRY 3,517,868
CARRIERS FOR FOOD PLATES, CUPS, SANDWICHES AND THE LIKE
Filed Oct. 9, 1967 5 Sheets-Sheet 2
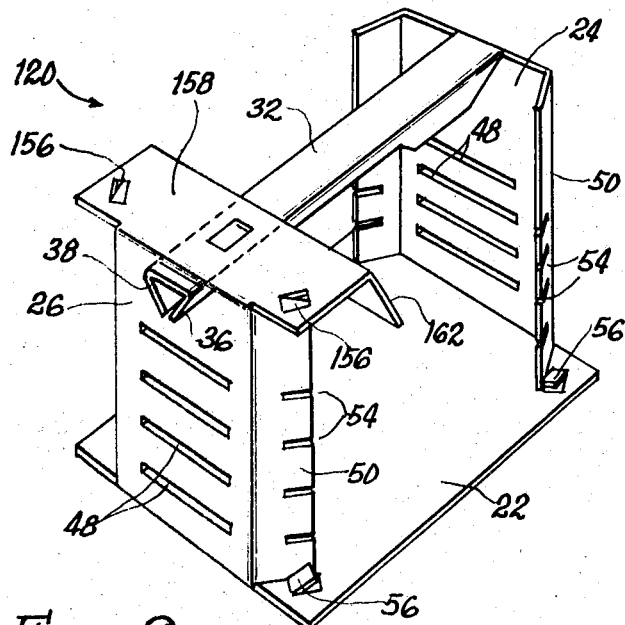
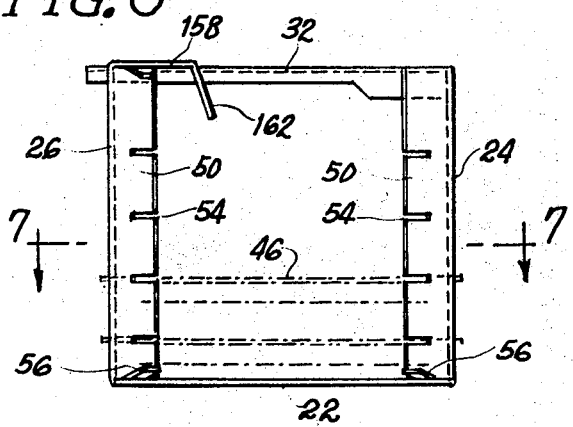
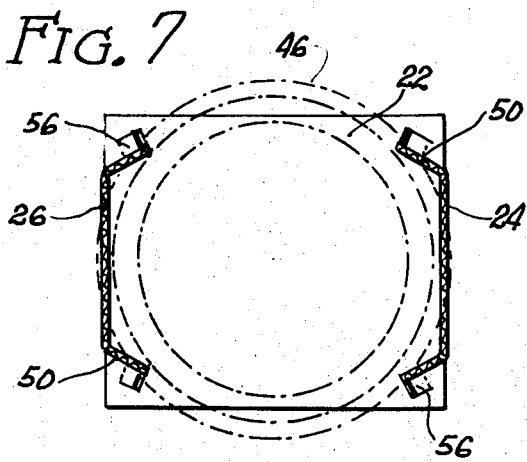
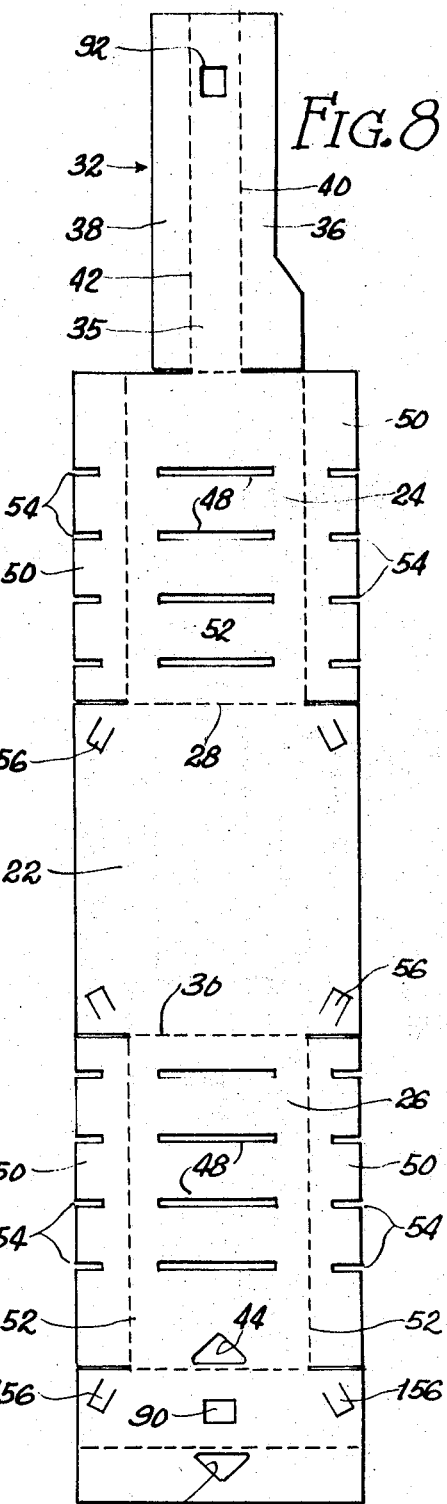

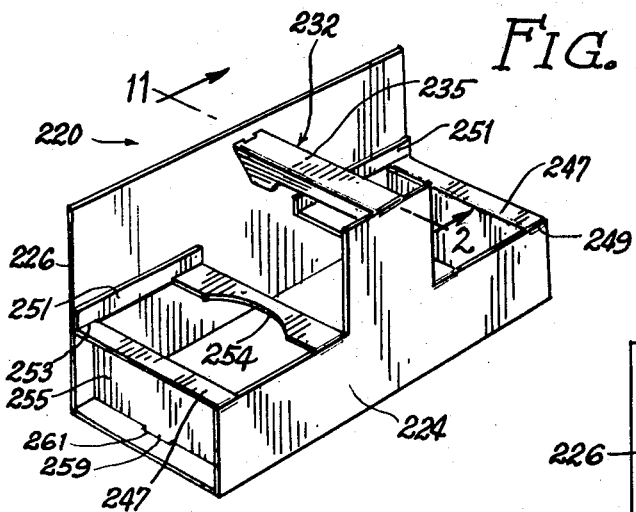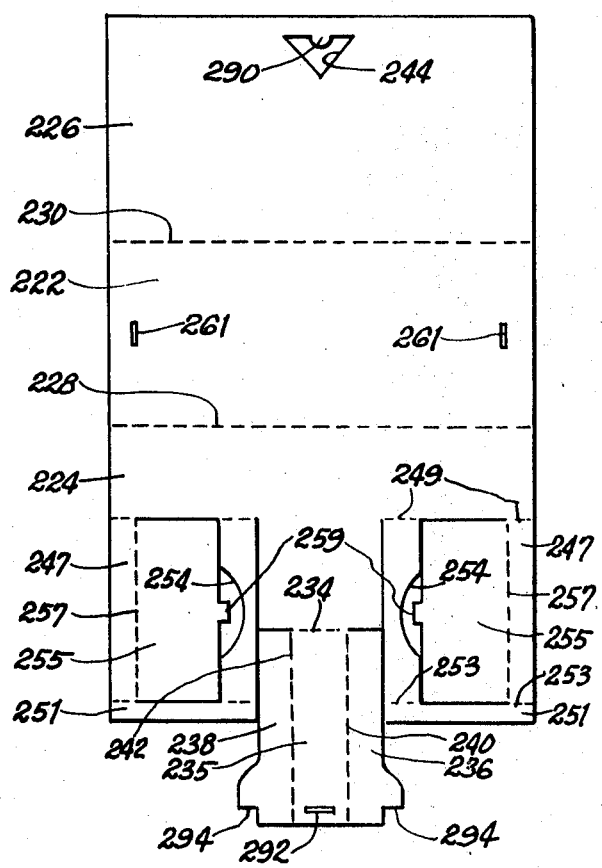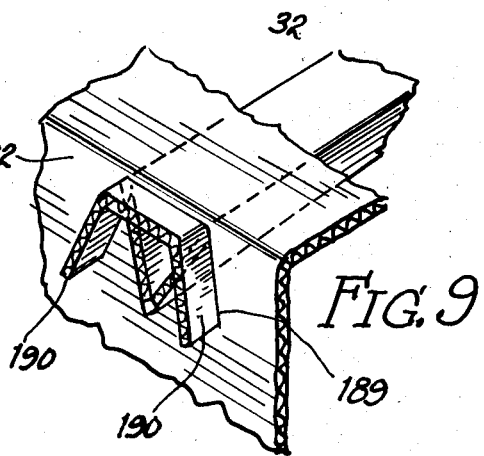

June 30, 1970  W. B. DAUGHTRY  3,517,868
CARRIERS FOR FOOD PLATES, CUPS, SANDWICHES AND THE LIKE
Filed Oct. 9, 1967  5 Sheets-Sheet 4

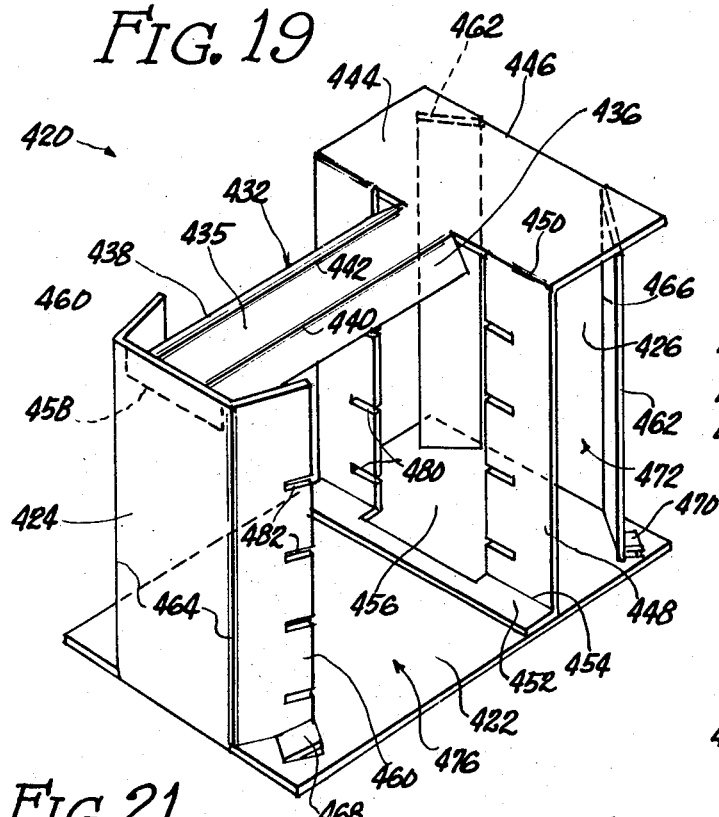
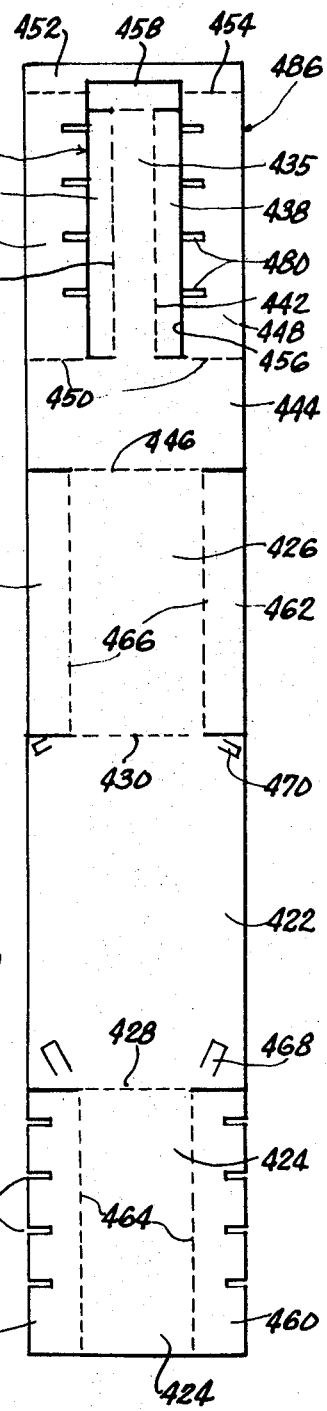
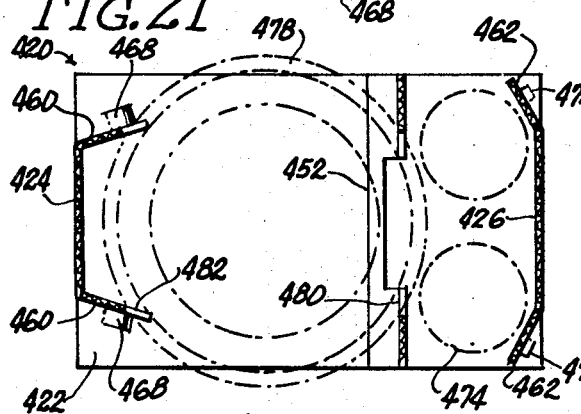
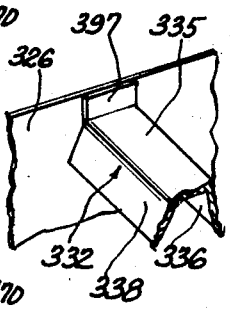
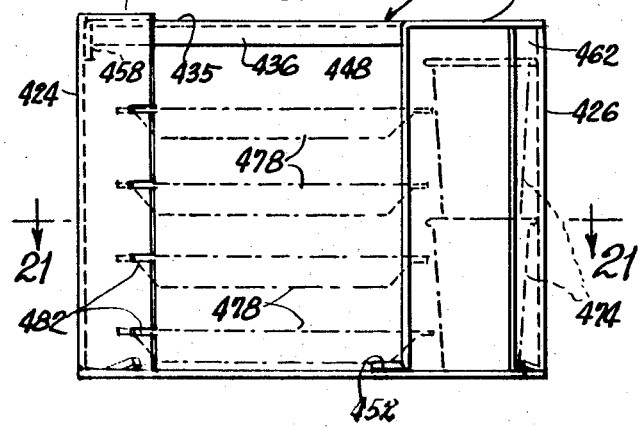

United States Patent Office 3,517,868
Patented June 30, 1970

3,517,868
CARRIERS FOR FOOD PLATES, CUPS,
SANDWICHES AND THE LIKE
Wallace B. Daughtry, 715 W. Elm St.,
Arlington Heights, Ill. 60004
Filed Oct. 9, 1967, Ser. No. 673,712
Int. Cl. B65d 5/46, 5/48
U.S. Cl. 224—45                               24 Claims

ABSTRACT OF THE DISCLOSURE

A carrier made of foldable material, such as corrugated cardboard, solid fiberboard, paperboard, molded pulp, or various solid or foamed plastics, or laminates of these or other materials, for example, comprising a bottom wall, first and second end walls extending upwardly from said bottom wall, and a handle extending between said first and second end walls, said handle having a horizontal panel and downwardly folded stiffening flanges thereon. In certain embodiment, the handle is folded from one end wall and is adapted to extend through an opening in the other end wall. The handle and the opening are preferably triangular in shape. Locking means are preferably provided to retain the handle in the opening. Each of the end walls may be provided with vertical retaining flanges folded toward the opposite end wall. The end walls and the retaining flanges may be formed with a series of slots to hold plates. In certain embodiments, the carrier comprises a top panel folded from said second end wall, a vertical panel folded downwardly from said top panel, a lower panel folded horizontally from said vertical panel, and means for connecting said lower panel to the bottom wall, the second end wall and the vertical panel forming a compartment for holding cups or the like. The vertical panel may be formed with a second opening for receiving the handle. Retaining flanges may be folded from said vertical panel toward said second end wall. Locking tabs are preferably provided to hold the various retaining flanges in their folded positions. In one embodiment, the handle is formed integrally with said top panel and is secured to said first end wall. In another embodiment, the carrier comprises one or more intermediate panels folded from said first end wall and secured to said second end wall, the intermediate panels preferably being formed with openings to receive cups or the like. Vertical flanges are preferably folded downwardly from said intermediate panels to provide rigidity. Locking tabs are preferably provided between vertical flanges and the bottom wall. A space for sandwiches or the like is preferably provided between the intermediate panels.

---

This invention relates to carriers adapted to hold food plates, beverage, cups, sandwiches and the like. Such carriers are extremely useful for restaurants, food stands, and the like, which sell food and beverages to be carried out.

Various carriers have been provided to hold carryout foods and beverages, but a need has existed for carriers having greater capacity and efficiency, which nevertheless are easier for the customers to use.

The present invention provides a variety of carriers, ecah of which is provided with a handle which enables the customer to grasp and firmly hold the carrier in one hand, so that the other hand is free to perform other necessary tasks, such as opening a car door, for example. The carriers of the present invention provide large capacity, so that several complete meals, comprising food plates and beverage cups may be held in one carrier. The carriers are stable and strong so that there is no danger of spilling or dropping the items being carried. The carriers may also be arranged to carry sandwiches and beverages. For convenient storage, all of the carriers are arranged so that they may be folded flat. The carriers are easy to erect from the folded blanks. The carriers may be made of low cost materials, such as plain or corrugated cardboard, solid fiber board, paperboard, molded pulp, chip board, or various solid or foamed plastics.

In general, each carrier preferably comprises a bottom wall, first and second end walls projecting upwardly therefrom, a handle extending between the end walls, and means connecting the handle to the upper portions of the end walls. The handle preferably comprises an elongated generally horizontal panel and a pair of stiffening flanges folded therefrom.

In certain embodiments, the handle is foldably connected to the first end wall and is received in an opening in the second end wall. The handle and the opening are preferably triangular in shape. Locking means are also preferably provided to secure the handle to the second end wall.

In other embodiments, the handle is foldably connected to both end walls and preferably is formed integrally with one end wall.

In various embodiments, the carrier preferably comprises vertical retaining flanges folded inwardly from either or both of the end walls. Horizontal slots may be formed in the end walls or the retaining flanges to hold a series of food plates. Locking devices are preferably provided to hold the retaining flanges in their folded positions.

In certain embodiments, the carrier preferably comprises a top panel foldably connected to the second end wall, and a vertical panel extending downwardly from the top panel. In certain cases, the handle is received in a second opening formed in the vertical panel. This construction increases the rigidity of the carrier.

In various embodiments, the vertical panel is extended downwardly and is connected to the bottom wall to provide a compartment for holding cups or the like. Vertical retaining flanges may be folded from the vertical panel. In one embodiment, the vertical panel is foldably connected to the bottom wall. In another embodiment, a lower panel is folded from the vertical panel and is connected to the bottom wall.

In one embodiment, the vertical panel is formed integrally with the handle and the top panel. The handle is cut from the vertical panel, so as to form an opening therein. Horizontal slots are preferably formed in the vertical panel along the opening, for receiving the edges of food plates or the like.

In certain embodiments, intermediate panels are folded from one end wall and secured to the other end wall, so as to extend horizontally therebetween. Openings are preferably formed in the intermediate panels to receive beverage cups or the like. Stiffening flanges are preferably folded downwardly from the intermediate panels. It is preferred to provide locking means between the stiffening flanges on the bottom wall. A space or opening is preferably provided between the intermediate panels, to hold sandwiches or the like.

Various other objects, features and advantages of the present invention will appear from the following description, taken with the accompanying drawings, in which:

FIG. 5 is a perspective view of a plate carrier, constituting a second embodiment.

FIG. 6 is a side elevation of the carrier of FIG. 5.

FIG. 7 is a horizontal section, taken generally along the line 7—7 in FIG. 6.

FIG. 8 is a plan view of the flat blank from which the carrier of FIG. 5 is erected.

FIG. 9 is a fragmentary perspective view showing a modified locking arrangement for the handles of the carriers of FIGS. 1–8.

FIG. 10 is a perspective view of a cup and sandwich carrier, constituting a third embodiment of the invention.

FIG. 11 is a vertical section, taken generally along the line 11—11 in FIG. 10.

FIG. 13 is a plan view of the flat blank for the carrier of FIG. 10 before the blank is folded and assembled into the collapsed position as shown in FIG. 12.

FIG. 17 is a plan view of the blank for the carrier of FIG. 14, before being folded and assembled as shown in FIG. 16.

FIG. 18 is a fragmentary perspective view showing a modified construction which is applicable to the carriers of FIGS. 10–17.

FIG. 19 is a perspective view of still another modified carrier for holding food plates and beverage cups or the like.

FIG. 20 is a side elevation of the carrier of FIG. 19.

FIG. 21 is a horizontal section, taken generally along the line 21—21 in FIG. 20.

FIG. 22 is a plan view of the flat blank from which the carrier of FIG. 19 is erected.

As already indicated, FIGS. 1–4 illustrate a carrier 20 which is especially well adapted for holding food plates and beverage cups. However, the carrier may be employed to hold various other items. The illustrated carrier is especially arranged to hold four food plates and four beverage cups. The capacity of the carrier may be varied by changing the size of the carrier. Thus, for example, the height of the carrier may be reduced, if it is desired to hold only two plates and two beverage cups.

The illustrated carrier 20 is made in one piece from a foldable sheet material. Various suitable sheet materials may be employed, such as corrugated cardboard, solid cardboard, chipboard, fiberboard, paperboard, molded pulp, solid plastics, foamed plastics, or various laminates of these or other materials, for example. The carrier may be cut from sheet stock or may be molded or otherwise formed.

Figure 1:
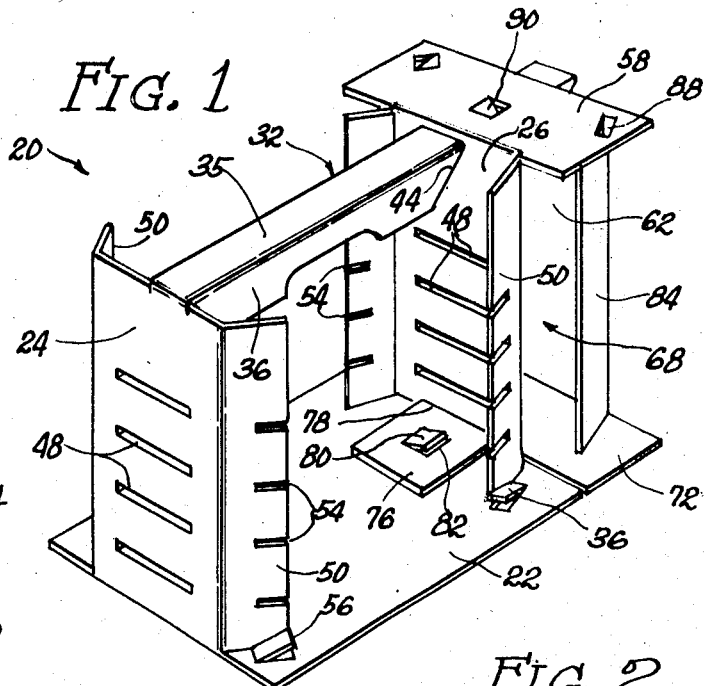
FIG. 1 is a perspective view of a plate and cup carrier, to be described as an illustrative embodiment of the present invention.

The carrier 20 of FIG. 1 comprises a bottom wall 22 which forms the base of the carrier. First and second end walls 24 and 26 are folded upwardly from the bottom wall 22. In the flat blank of FIG. 4, these folds are formed along score lines 28 and 30.

A handle 32 is folded from the first end wall 24, and extends in a generally horizontal direction to the second end wall 26. This fold is along a score line 34 in FIG. 4. As shown, the handle 32 has an elongated, generally horizontal panel 35.

To stiffen the handle 32, it is preferred to fold a pair of flanges 36 and 38 from the horizontal panel 35. These folds are formed along score lines 40 and 42. The illustrated flanges 36 and 38 are folded downwardly, but in some cases they could be folded upwardly.

An opening 44 is formed in the second end wall 26 to receive the handle 32. Preferably, the handle 32 is triangular in cross section, so that the opening 44 is also preferably triangular. It will be seen that the opening 44 is at the upper end of the second end wall 26. In order to hold a series of food plates 46, the end walls 24 and 26 are preferably formed with a series of vertically spaced generally horizontal slots 48. In the illustrated carrier 20, four such sots 48 are formed in each end wall, to provide a capacity of four plates. It will be understood that the number of slots may be varied, in accordance with the desired capacity.

To provide better retention of the plates 46, it is preferred to form each of the end walls 24 and 26 with a pair of generally vertical retaining flanges 50, which are folded from each end wall toward the opposite end wall. These folds are along score lines 52. Plate receiving slots 54 are also formed in the retaining flanges 50.

Figure 2:
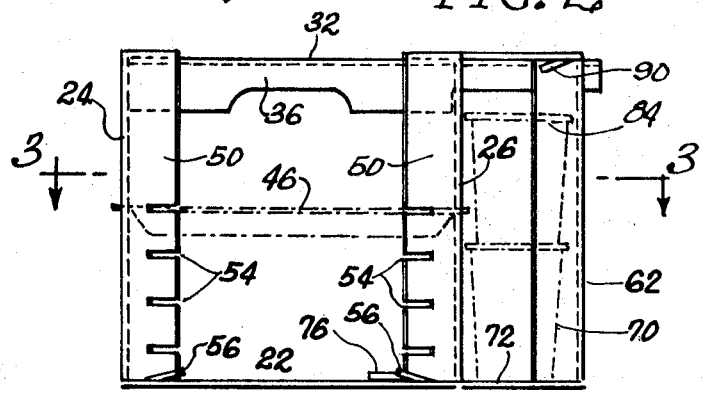
FIG. 2 is a side elevation of the carrier of FIG. 1.
Figure 3:
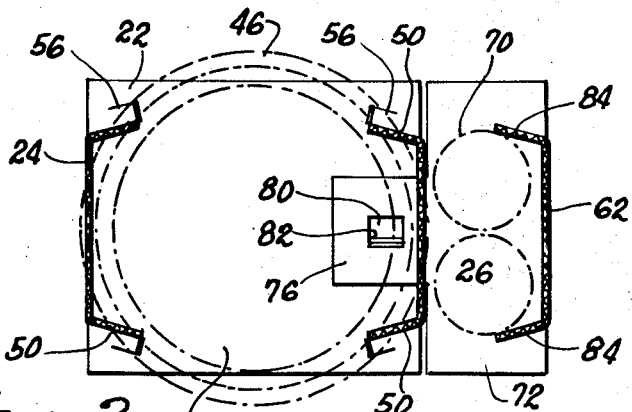
FIG. 3 is a horizontal section, taken generally along the line 3—3 in FIG. 2.

Locking means are preferably provided to hold the retaining flanges 50 in their folded position. As shown in FIGS. 1 and 2, such locking means preferably comprise tabs or ears 56 which are adapted to be folded upwardly from the bottom wall 22. The illustrated tabs 56 are cut from the bottom wall 22.

To give the carrier 20 greater rigidity, a top panel 58 is preferably folded from the second end wall 26, along a score line 60. A generally vertical panel 62 is folded downwardly from the top panel 58, along a score line 64. The handle 32 preferably extends through another opening 66 in the depending panel 62. The opening 66 is similar to the opening 44. The engagement of the handle 32 with the vertical panel 62, as well as the end wall 26, provides a bracing effect which rigidifies the carrier.

The vertical panel 62 is also preferably employed to provide a compartment 68, adapted to hold a plurality of cups 70 or the like. The illustrated compartment 68 is capable of holding four cups. It will be understood that the size of the compartment 68 may be varied, in accordance with the desired capacity.

To form the compartment 68, means are provided to connect the lower end of the vertical panel 62 to the bottom wall 22, or the lower end of the second end wall 26. In the illustrated construction, a lower panel 72 is folded from the vertical panel 68 along a score line 74. The lower panel 72 is at approximately the same level as the bottom wall 22. It will be seen that the lower panel 72 extends between the vertical panel 62 and the end wall 26. In the illustrated construction, the lower panel 72 is formed with a tongue 76 which extends through a slot 78 in the end wall 26, just above the bottom wall 22. Means are preferably provided to connect the tongue 76 to the bottom wall 22. As shown, a tab 80 is adapted to be folded upwardly from the bottom wall 22, into an opening 82 formed in the tongue 76.

The vertical panel 62 is preferably formed with a pair of vertical retaining flanges 84 which are folded therefrom along score lines 86. The retaining flanges 84 project toward the end wall 26 and are effective to retain the cups 70 in the compartment 68. Means are preferably provided to hold the retaining flanges 84 in their folded positions. As shown, such means take the form of tabs 88 adapted to be folded downwardly from the top panel 58, so as to engage and hold the retaining flanges 84.

The carrier is preferably provided with means for securing the handle 32 in its position within the opening 44 in the second end wall 26. As illustrated, such means take the form of a tab 90, adapted to be folded downwardly from the top panel 58, through an opening 92 in the horizontal panel 42 of the handle 32. One of the flanges 36 on the handle 32 is also formed with a stop shoulder or tab 94, adapted to engage the second end wall 26, so as to limit the movement of the handle through the opening 44.

Figure 4:
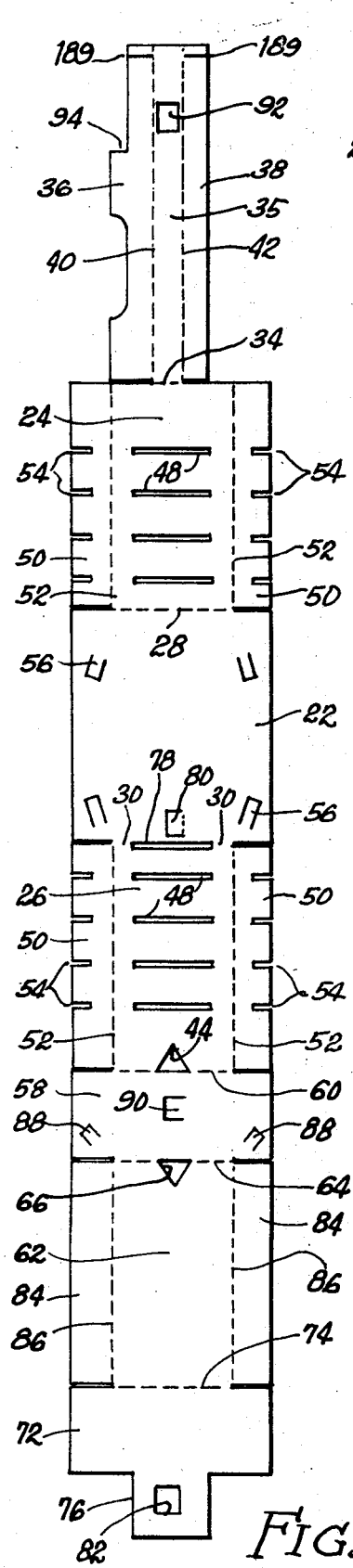
FIG. 4 is a plan view of the flat blank from which the carrier of FIG. 1 is erected.
Figure 14:
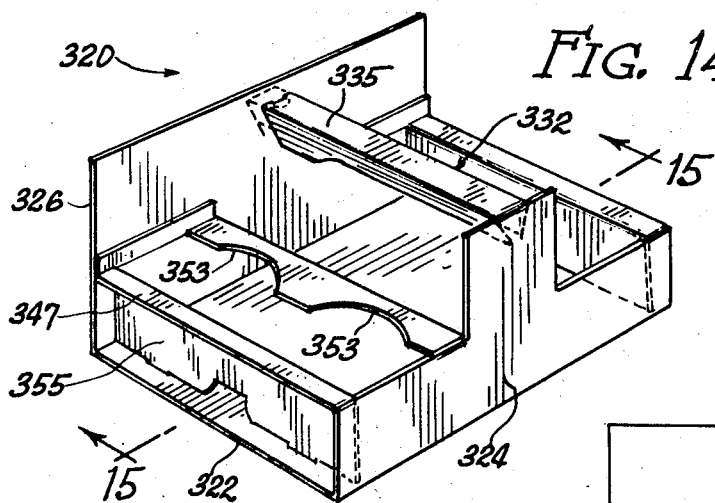
FIG. 14 is a perspective view of a carrier similar to that of FIG. 10, but having a greater capacity.
Figure 15:
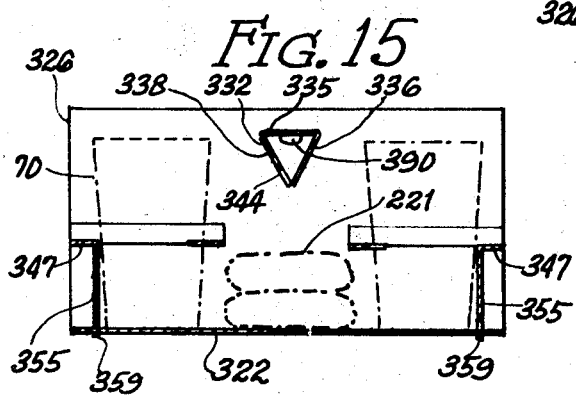
FIG. 15 is a vertical section, taken generally along the line 15—15 in FIG. 14.

The carrier 20 is manufactured in the form of a flat blank, as shown in FIG. 4. For storage, the blank may conveniently be folded along one of the transverse score lines, preferably the score line 30 between the bottom wall 22 and the second end wall 26. It will be evident that the carrier may be erected very quickly and easily, from the flat position of FIG. 4 to the erected position of FIG. 1. This is done by folding up the end wall 26, folding the panels 58, 68 and 72, inserting the tongue 76 through the slot 78, and inserting the handle 32 through the triangular openings 44 and 66. The tab 80 is folded upwardly through the opening 82 in the tongue 76. The handle locking tab 90 is folded downwardly into the opening 92 in the handle.

To retain the plates 46, the flanges 50 are folded from the end walls 24 and 26. The locking tabs 56 are folded upwardly to retain the flanges 50.

The cups 70 are retained by folding the flanges 84 from the vertical panel 62. The locking tabs 88 are then folded downwardly to retain the flanges 84.

FIGS. 5-8 illustrate a modified carrier 120 which is similar to the carrier 20 of FIG. 1, except that the carrier 120 is adapted to hold four food plates, but without the beverage cups, which may also be held on the carrier 20 of FIG. 1. It will be understood that the capacity of the carrier 120 may be either increased or decreased to hold any desired number of plates.

In the carrier 120 of FIG. 5, many of the components are unchanged. Thus, the bottom wall 22, the first end wall 24, the second end wall 26 and the handle 32 are of substantially the same construction as previously described. However, the carrier 120 preferably comprises a top panel 158 and a generally vertical panel 162 which differ from the corresponding components of FIG. 1. The vertical panel 162 is shorter, so that it is in the form of a flange, projecting downwardly from the top panel 158. In this case, the top panel 158 is folded toward the first end wall 24, rather than away from the first end wall, as in the case of FIG. 1. Thus, the generally vertical panel 162 projects downwardly between the end walls 24 and 26.

As before, an opening 166 is formed in the generally vertical panel 162 to receive the handle 32. The top panel 58 and the vertical flange 162 rigidify the carrier 120.

As before, the retaining flanges 50 are preferably formed on the end walls 24 and 26. The plate receiving slots 48 and 54 are preferably formed in the end walls and the flanges 50.

Additional locking tabs 156 are preferably provided on the top panel 158 and are adapted to be folded downwardly, so as to engage and retain the flanges 50. The locking tabs 56 are provided on the lower wall 22, as before.

The carrier 120 is made in the form of a flat blank, as shown in FIG. 8. For compact storage, the blank may be folded along one of the transverse score lines, such as the score line 28.

FIG. 9 illustrates a modified locking device for the handle 32 of either of the carriers of FIGS. 1-8. In this case, the flenges 36 and 38 of the handle 32 are cut along lines 189 to form locking tabs 190 adjacent the end of the handle 132. The locking tabs 190 are adapted to be swung outwardly to retain the handle. The tabs 190 engage the vertical panel 62, in the carrier 20, or the end wall 26, in the carrier 120. When the locking tabs 190 are provided, it is not necessary to provide the locking tab 90 of FIG. 1.

FIGS. 10-13 illustrate still another carrier 220, adapted to hold two of the beverage cups 70, and a plurality of sandwiches 221, or various other food items. As before, the carrier 220 comprises a bottom wall 222 and end walls 224 and 226, folded upwardly therefrom along score lines 228 and 230. A handle 232 is folded from the first end wall 224, along a score line 234. The handle 232 preferably comprises a generally horizontal panel 235, from which two stiffening flanges 236 and 238 are folded, along score lines 240 and 242.

An opening 244 is preferably formed in the second end wall 226 to receive the handle 232. As before, the handle 232 and the opening 244 are preferably triangular in shape.

The carrier 220 differs from the previously described construction, in that the carrier 220 is provided with one or more intermediate panels 247, which are folded from the end walls 224 along score lines 249. It will be seen that two of the intermediate panels 247 are provided in the carrier 220 of FIG. 10. The panels 247 are generally horizontal and are at a lower elevation than the handle 232. Each intermediate panel 247 extends between the end walls 224 and 226. Means are provided to connect each panel 247 to the end wall 226. In the illustrated construtcion, each intermediate panel 247 is formed with a flange or flap 251 which is folded therefrom along a score line 253. The flange 251 is glued, stapled or otherwise suitably secured to the end wall 226.

Figure 12:
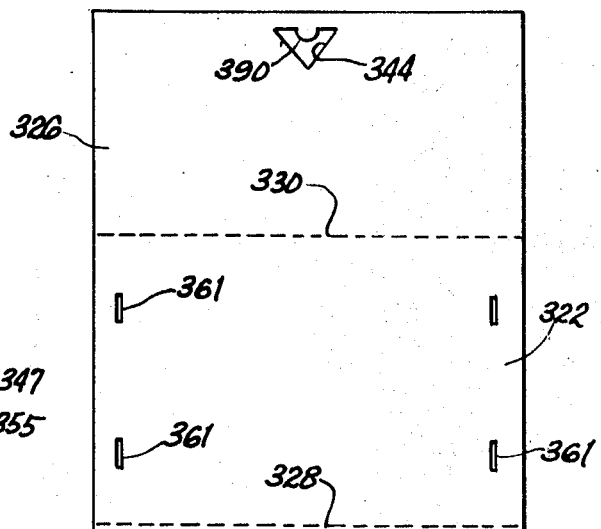
FIG. 12 is a plan view of the carrier of FIG. 10, in the collapsed or flattened position in which it is normally stored.
Figure 16:
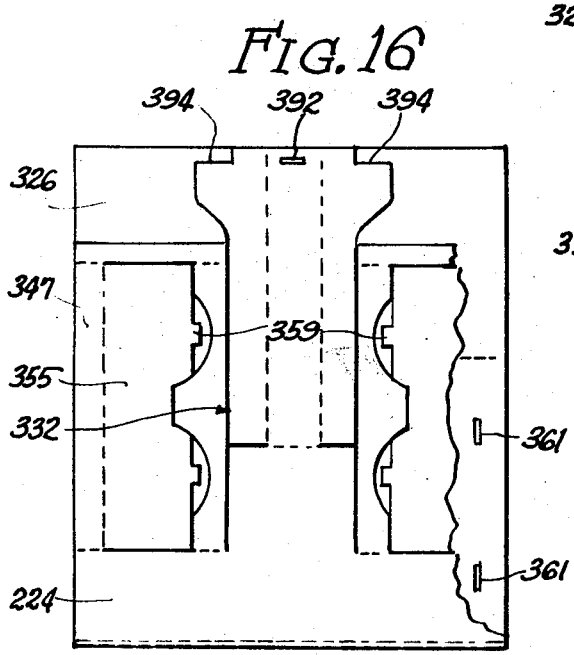
FIG. 16 is a plan view, showing the carrier of FIG. 14 in a collapsed or flattened position.

The construction and arrangement of the intermediate panels 247 is such that the carrier 220 may be flattened or collapsed, as shown in FIG. 12. In this way, the carrier 220 may be stored very compactly, prior to use.

One or more opening 254 are preferably provided in the intermediate panels 247 to receive and locate the beverage cups 70. In the carrier 220 of FIG. 10, each intermediate panel 247 has one such opening 254.

Means are preferably provided to rigidify the carrier 220. In FIG. 10, such means take the form of vertical flanges or panels 255, folded downwardly from the intermediate panels 247 along score lines 257. The flanges 255 preferably extend downwardly to the bottom wall 222. Moreover, the flanges 255 preferably extend between the end walls 224 and 226.

Means are preferably provided to connect the flanges 255 to the bottom wall 252. In the illustrated construction, such means take the form of tabs or ears 259, formed on the flanges 255, and projecting into slots or openings 261 in the bottom wall 222. It will be understood that the bottom wall 222 is sufficiently resilient to permit the entry of the tabs 259 into the slots 261.

Means are also preferably provided to lock the handle 232 to the end wall 226. As shown, the end wall 226 is formed with a tab 290 which projects into a slot or opening 292 in the handle 232. The tab 290 and the horizontal panel 235 of the handle 232 are sufficiently springy to permit the tab to enter the slot 222.

The handle flanges 236 and 238 are also preferably provided with stop shoulders or ears 294 which engage the end wall 226 and limit the movement of the handle 232 through the triangular opening 244.

The carrier 220 is made in a flat blank, as shown in FIG. 13, and then is folded and assembled, as shown in FIG. 12. The flanges 251 is glued, stapled or otherwise secured to the end wall 226 to complete the assembly of the blank. The carrier is shipped and stored in the collapsed position, as shown in FIG. 12.

It is easy to erect the carrier to the position shown in FIG. 10. This is done by unfolding the carrier so that the end wall 224 and the intermediate panels 247 are moved away from the bottom wall 222 and the end wall 226. The stiffening flanges 255 are then folded downwardly. The handle 232 is folded and then is inserted through the opening 244, where it is retained by the tab 290.

FIGS. 14-17 illustrate another modified carrier 320, which is similar to the carrier 220, but is enlarged in size to provide greater capacity. The carrier 320 is capable of holding four of the beverage cups 70, and a larger number of the sandwiches 221. All of the components of the carrier 320 correspond to the components of the carrier 220. To avoid repetition of description, the components of the carrier 320 have been given the same reference characters, increased by 100. Thus, it will be sufficient to describe the differences between the carriers 320 and 220.

The bottom wall 322 is the same as before, except that it is of greater size, so that the end walls 324 and 326 are farther apart. The end walls are the same as before.

The handle 332 is the same as before, except that it is longer. The intermediate panels 347 are also longer. Moreover, each intermediate panel 347 is formed with two of the openings 353, to receive and locate two beverage cups 70. The two openings 353 in each panel 347 are connected together. As before, the openings 353 are formed in part by the folding of the flanges 355 from the intermediate panels 347.

The flanges 355 are longer and are formed with a plurality of locking tabs 359, which are adapted to be received in the slots 361, formed in the bottom wall 322.

The carrier 320 is erected in the same manner as carrier 220. When erected, the carrier 320 will hold four beverage cups. The space between the intermediate panels 347 will hold four or more sandwiches and other food.

FIG. 18 illustrates a modified construction which is particularly applicable to the carriers of FIGS. 10–17. However, this construction can also be applied to the carriers of FIGS. 1–9. In the modified construction of FIG. 18, the handle 332 is foldably connected to the end wall 326. Thus, the horizontal panel 335 of the handle 332 is formed with a flap or flange 397 which is secured to the end wall 326. The flap 397 is preferably folded upwardly from the horizontal panel 335. It will be understood that the flap 397 may be secured to the end 326 in any suitable manner, as by gluing, stapling, taping, heat sealing, electronic welding, or electro-sonic welding, for example. The flap 397 is normally glued or otherwise secured to the end wall 326 at the factory, so that the carrier is shipped flat, in the manner illustrated in FIGS. 12 and 16. The foldable connection between the handle 332 and end wall 326 makes it easy to erect the carrier. This is done by unfolding the blank so as to swing the end walls 324 and 326 into vertical positions. The handle 332 is thereby swung into a horizontal position between the end walls. The stiffening flanges 336 and 338 are then folded downwardly from the handle. The reinforcing flanges 355 are folded downwardly from the intermediate panels 347.

Various other modifications may be made in the carrier 320. Thus, for example, the reinforcing flanges 355 may be folded upwardly from the bottom wall 320, instead of being folded downwardly from the intermediate panels 347.

FIGS. 19–22 illustrate still another modified carrier 420 which is similar to the carriers of FIGS. 1–9, in that it is particularly useful for carrying food plates and beverage cups. The carrier 420 is advantageously constructed in such a manner as to require less material than the carrier of FIG. 1, while having substantially the same capacity. Thus, the carrier 420 may be constructed more economically than the carrier of FIG. 1. Moreover, the carrier 420 of FIGS. 19–22 may be erected more easily and quickly than the carrier of FIG. 1.

As illustrated, the carrier 420 comprises a bottom wall 422, with end walls 424 and 426 extending upwardly therefrom. The end walls 424 and 426 are foldably connected to the bottom wall 422. As illustrated, the walls 422, 424 and 426 are formed integrally from corrugated cardboard or other suitable material. The end walls 424 and 426 are folded upwardly along fold lines or score marks 428 and 430.

The carrier 420 comprises a handle 432 which extends between the upper portions of the end walls 424 and 426. In this carrier, the handle 432 is foldably connected to both end walls 424 and 426, as will be described in detail presently. The illustrated handle 432 comprises a horizontal panel 435, from which a pair of longitudinal stiffening flanges 436 and 438 are folded downwardly along fold lines 440 and 442.

The horizontal panel 435 of the handle 432 is preferably formed integrally with a top panel 444 which is foldably connected to the end wall 426. As illustrated, the top panel 444 is formed integrally with the end wall 426 and is folded therefrom along a fold line 446.

The carrier 420 preferably comprises a vertical panel 448 which extends between the top panel 444 and the bottom wall 422 and is illustrated as being foldably connected thereto. Preferably, the vertical panel 448 is formed integrally with the top panel 444 and is folded therefrom along a fold line 450. The foldable connection between the vertical panel 448 and the bottom wall 422 is preferably provided by a flap or flange 452, folded from the vertical panel 448 along a fold line 454. The flap 452 may be secured to the bottom wall 422 in any suitable manner, as by gluing, stapling, heat sealing, or welding, for example.

The handle 432 is preferably cut from the vertical panel 448, with the result that an opening 456 is formed in the vertical panel. It will be understood that the vertical panel 448 is folded downwardly from the top panel 444, while the handle 432 is not folded relative to the top panel. A considerable saving in material is brought about by cutting the handle 432 from the vertical panel 448.

As already indicated, the illustrated handle 432 is foldably connected to the end wall 424. In the illustrated construction, this foldable connection is brought about by means of the flap or flange 458, folded from the handle 432, and glued, stapled, welded or otherwise secured to the upper portion of the end wall 424.

It is preferred to form generally vertical retaining flanges on either or both of the end walls 424 and 426. As shown, such retaining flanges 460 and 462 are formed on the end walls 424 and 426, respectively. Preferably, the flanges 460 and 462 are formed integrally with the end walls 424 and 426 and are folded therefrom toward the vertical panel 448. The flanges 460 and 462 are folded along score lines 464 and 466.

Means are preferably provided to retain the flanges 460 and 462 in their folded positions. As shown, locking tabs or ears 468 and 470 are cut from the bottom wall 422 and are adapted to be folded upwardly to retain the flanges 460 and 462. Such locking tabs could also be formed on the top panel 444.

The end wall 426 and the vertical panel 448 form a compartment 472 adapted to hold beverage cups 474 or the like. The inturned flanges 462 are adapted to retain the beverage cups 474 in the compartment 472. Thus at least one of the flanges 462 is preferably folded inwardly after the beverage cups 474 have been placed in the compartment 472. The locking tabs 470 insure that the beverage cups will be retained in the compartment 472. The flanges 462 also impart rigidity to the carrier 420.

The end wall 424 and the vertical panel 448 form another compartment 476 adapted to hold food plates 478 or the like. To support a plurality of the food plates, it is preferred to form substantially horizontal slots 480 in the vertical panel 448, along the opening 456. In the illustrated construction, four such slots are formed along each side of the opening 456, to support four food plates.

Similarly, it is preferred to form generally horizontal slots 482 in the end wall 424 or the flanges 460. The illustrated slots 482 are formed along the edges of the flanges 460, opposite the corresponding slots 480 in the vertical panel 448.

The flanges 460 are effective to retain the food plates 478 in the carrier 420. Thus, at least one of the flanges 460 is folded inwardly, after the food plates 478 have been mounted in the carrier 420. The locking tabs 468 insure that the food plates will be retained against accidental displacement.

FIG. 22 illustrates the carrier 420 in the form of a flat blank 486. It will be noted that the carrier 420 may be cut from the blank 486 without any substantial waste, except for the small amount of material which is cut from the blank to form the slots 480 and 482.

Normally, the blank 486 is cut and scored at the factory, in the manner shown in FIG. 22. The blank 486 is then folded double along the score line 446 between the end wall 426 and the top panel 444. Next the flap 452 is glued, stapled or otherwise secured to the bottom wall 422. The blank is then folded double along the score line 428 between the end wall 424 and the bottom wall 422. Finally the flap 458 is glued, stapled or otherwise secured to the end wall 424.

Thus, the carrier 420 is fully assembled at the factory, but is left flat for shipment. When the carrier is to be used, it is manipulated so that the end walls 424 and 426 will be swung upwardly. Simultaneously, the vertical panel 448 is also swung upwardly. The beverage cups 474 are placed in the compartment 472, and then the flanges 462 are folded inwardly to retain the cups. The tabs 470 are folded upwardly to hold the flanges 462 in their folded positions.

Next, one of the flanges 460 is folded inwardly and is locked in place by folding the corresponding tab 468 upwardly. The food plates 478 may then be mounted in slots 480 and 482. Next, the other flange 460 is folded inwardly so that the slots 482 therein will receive the edges of the plates. The corresponding tab 468 is swung upwardly to retain the flange 460. The longitudinal flange 436 and 438 are folded downwardly to impart rigidity to the handle 432. The flanges may also be folded upwardly with a similar effect. It will be recognized that the handle makes it very easy to grasp and hold the food carrier, so that there will be no substantial chance of dropping or spilling the food, plates and beverage cups contained therein.

It is perfectly feasible to reuse the carrier, but the cost of the carrier is so low that normally it will be treated as an expendable, single service item. Normally, the customer will discard the carrier after a single use.

The carrier illustrated in FIG. 19 is capable of holding four food plates and a corresponding number of beverage containers. It will be recognized, however, that the size and capacity of the carrier may be varied.

It will be evident that each carrier of the present invention provides a handle which enables the carrier to be securely grasped and held in one hand. Thus, a person can easily transport two of the carriers, without any danger of spilling or dropping the food. If only one carrier is transported, the other hand is free for other necessary tasks.

The carriers of the present invention provide great capacity, so that several full plates of food and several beverages can be carried simultaneously. The carriers may also be arranged to carry sandwiches and other food items in large numbers.

The carriers are so constructed that they can be shipped and stored in a flat position, to conserve space. The carriers may be erected very easily and quickly.

Inasmuch as the carriers are made of cardboard or other inexpensive materials, the carriers are very low in cost. Thus, the carriers may be treated as expendable items to be thrown away after use.

Various other modifications, alternative constructions and equivalents may be employed without departing from the true spirit and scope of the invention, as exemplified in the foregoing description and defined in the following claims.

I claim:
1. A carrier for food, beverages or the like, comprising a bottom wall made of foldable material, first and second end walls extending upwardly from opposite ends of said bottom wall,
a handle extending between said first and second end walls,
means connecting said handle to the upper portions of said first and second end walls,
said handle having an elongated generally horizontal panel and a pair of stiffening flanges folded therefrom,
a top panel folded generally in a horizontal direction from the upper end of said second end wall,
a generally vertical panel folded downardly from said top panel and spaced from said second end wall,
and means for connecting said vertical panel to said bottom wall to form a compartment between said second end wall and said vertical panel.
2. A carried according to claim 1,
in which said second end will and said vertical panel are formed with openings for receiving said handle.
3. A carrier according to claim 1,
including at least one generally vertical retaining flange folded from said vertical panel,
and locking means for holding said retaining flange in its folded position.
4. A carrier according to claim 3,
in which said locking means comprise a tab foldable from said top panel and engageable with said retaining flange.
5. A carrier according to claim 1,
in which said last mentioned means includes a lower panel folded from said vertical panel,
and means for connecting said lower panel to said bottom wall to form a compartment between said vertical panel and said second end wall.
6. A carrier according to claim 5,
in which said last mentioned means comprise at least one generally horizontal tongue formed on said lower panel,
said second end wall having a slot therein adjacent said bottom wall for receiving said tongue.
7. A carrier according to claim 6,
including locking means for retaining said tongue in said slot,
said locking means comprising a tab foldable from said bottom wall,
said tongue having an opening for receiving said tab.
8. A carrier according to claim 5,
including a pair of generally vertical retaining flanges folded from said vertical panel toward said second end wall.
9. A carrier according to claim 5,
in which said end walls are formed with horizontally aligned slots for receiving plates or the like.
10. A carrier according to claim 5,
including a pair of generally vertical retaining flanges folded from each of said end walls toward the opposite end wall,
said retaining flanges and said end walls being formed with slots for receiving plates or the like.
11. A carrier for food, beverages or the like,
comprising a bottom wall made of foldable material,
first and second end walls extending upwardly from opposite ends of said bottom wall,
a handle extending between said first and second end walls,
means connecting said handle to the upper portions of said first and second end walls,
said handle having an elongated generally horizontal panel and a pair of stiffening flanges folded therefrom,
a top panel formed integrally with said horizontal panel of said handle and foldably connected to said second end wall,
said handle being foldably connected to said first end wall,
a generally vertical panel foldably connected to said top panel and extending downwardly therefrom,
and means foldably connecting the lower portion of said vertical panel to said bottom wall at an intermediate point between said first and second end walls.
12. A carrier according to claim 11,
in which said handle is formed integrally with one of said end walls and is folded therefrom,
said handle being foldably connected to the other end wall.

13. A carrier according to claim 12,
in which at least one of said end walls is formed with a generally vertical flange folded therefrom towards the opposite end wall.

14. A carrier according to claim 11,
in which said handle is formed integrally with one of said end walls and folded therefrom,
said handle being connected to the other end wall by a foldable flap connected therebetween.

15. A carrier according to claim 11,
in which said vertical panel is formed integrally with said top panel and said handle,
said handle being cut from said vertical panel to form an opening therein.

16. A carrier according to claim 15,
in which horizontal slots are formed in said vertical panel along said opening for receiving the edges of food plates or the like.

17. A carrier according to claim 16,
in which said first end wall is formed with generally vertical flanges folded therefrom toward said vertical panel,
said flanges being formed with additional slots disposed opposite said slots in said vertical panel.

18. A carrier according to claim 17,
including means on said bottom wall for retaining said vertical flanges in their folded positions.

19. A carrier according to claim 17,
in which said second end wall is formed with generally vertical retaining flanges folded therefrom toward said vertical panel.

20. A carrier according to claim 19,
including locking means for holding said last mentioned vertical retaining flanges in their folded positions.

21. A carrier according to claim 11,
in which said first end wall is formed with generally vertical flanges folded therefrom toward said vertical panel.

22. A carrier according to claim 11,
in which said second end wall is formed with generally vertical flanges folded therefrom toward said vertical panel.

23. A carrier according to claim 11,
in which said first and second end walls are formed with generally vertical flanges folded therefrom toward said vertical panel.

24. A carrier according to claim 23,
in which said vertical panel and said vertical flanges on said first end wall are formed with horizontal slots for receiving the edges of food plates or the like.

References Cited

UNITED STATES PATENTS

| | | |
|---|---|---|
| 2,033,526 | 3/1936 | Kinkenon. |
| 2,087,309 | 7/1937 | Stumpf. |
| 2,098,639 | 11/1937 | Walther _____ 229—52 X |
| 2,918,206 | 12/1959 | Kleingers _____ 229—52 |
| 3,018,032 | 1/1962 | Butterfill _____ 229—52 |

GERALD M. FORLENZA, Primary Examiner

U.S. Cl. X.R.

229—28

PO-1050
(5/69)

UNITED STATES PATENT OFFICE
CERTIFICATE OF CORRECTION

Patent No. 3,517,868           Dated June 30, 1970

Inventor(s) W.B. Daughtry

It is certified that error appears in the above-identified patent and that said Letters Patent are hereby corrected as shown below:

Column 1, line 20, "embodiment" should read "embodiments."
Column 1, line 55, after "beverage" delete the comma.
Column 4, line 5, "sots" should read "slots."
Column 4, line 16, "position" should read "positions."
Column 5, line 53, "flenge" should read "flanges."
Column 6, line 11, "strutcion" should read "construction."

Column 7, line 25, after "end" insert "wall."
Column 8, line 3, "foldable" should read "foldably."
Column 9, line 22, "flange" should read "flanges."
Column 10, line 7, "will" should read "wall."

SIGNED AND
SEALED
OCT 13 1970

(SEAL)
Attest:

Edward M. Fletcher, Jr.
Attesting Officer

WILLIAM E. SCHUYLER, JR.
Commissioner of Patents